United States Patent [19]

Couture et al.

[11] Patent Number: 5,619,787
[45] Date of Patent: Apr. 15, 1997

[54] METHOD FOR MOUNTING CONDUCTOR SECTIONS ONTO A STATOR FRAME OF A DYNAMOELECTRIC MACHINE

[75] Inventors: Pierre Couture, Boucherville; Bruno Francoeur, Beloeil; André Langlois, Gramby; Jacques Leduc, St-Mathieu de Beloeil; Stéphane Reiher, Ste-Julie; Jan Svoboda, Longueuil, all of Canada

[73] Assignee: Hydro-Quebec, Montreal, Canada

[21] Appl. No.: 378,821

[22] Filed: Jan. 27, 1995

Related U.S. Application Data

[62] Division of Ser. No. 264,504, Jun. 23, 1994.

[51] Int. Cl.⁶ .................................................. H02K 15/085
[52] U.S. Cl. ...................................................... 29/596; 29/732
[58] Field of Search ................................. 29/596, 606, 732

[56] References Cited

U.S. PATENT DOCUMENTS

| | | |
|---|---|---|
| 688,137 | 12/1901 | Lamme . |
| 693,578 | 2/1902 | Wait . |
| 1,658,300 | 2/1928 | Pleasant . |
| 1,721,636 | 7/1929 | O'Brien . |
| 2,985,106 | 5/1961 | Rhudy . |
| 3,079,519 | 2/1963 | Kitson et al. . |
| 3,453,468 | 7/1969 | Lund . |
| 3,631,278 | 12/1971 | Snively ................................. 310/278 |
| 3,675,058 | 7/1972 | Beddows et al. ..................... 310/71 |
| 3,775,628 | 11/1973 | Anderson et al. ................... 310/208 |
| 3,840,416 | 10/1974 | Schindelmeiser et al. . |
| 3,914,860 | 10/1975 | Schuler .................................. 29/596 |
| 4,307,313 | 12/1981 | Rohrer . |
| 4,321,497 | 3/1982 | Long .................................... 310/198 |
| 4,346,320 | 8/1982 | Davey .................................. 310/179 |
| 4,402,129 | 9/1983 | Kreuzer et al. ....................... 29/596 |
| 4,774,428 | 9/1988 | Konecny .............................. 310/198 |
| 4,818,909 | 4/1989 | Balke .................................. 310/208 |
| 5,010,639 | 4/1991 | Veser ................................ 29/606 X |
| 5,056,922 | 10/1991 | Cielo et al. ......................... 356/376 |
| 5,454,156 | 10/1995 | Morr .................................... 29/596 |

FOREIGN PATENT DOCUMENTS

| | | |
|---|---|---|
| 2244284 | 4/1975 | France . |
| 2430123 | 1/1980 | France . |
| 3915606 | 11/1989 | Germany ............................. 29/596 |
| K11896 | of 1910 | United Kingdom . |
| 545101 | 3/1946 | United Kingdom . |
| 2079194 | 1/1982 | United Kingdom . |

OTHER PUBLICATIONS

*Patent Abstract of Japan*, vol. 006 No. 067 (E–104), Apr. 28, 1982 & JP,A,57 009248 (Toshiba Corp) Jan. 18, 1982, voir abrégé.

*Primary Examiner*—S. Thomas Hughes
*Attorney, Agent, or Firm*—Foley & Lardner

[57] ABSTRACT

A method for mounting conductor sections of a stator winding onto a circular shaped stator frame of a dynamoelectric machine. Each conductor section has two parallel conductor sides and at least one conductor head connecting two adjacent ends of the parallel sides. The stator frame is provided with circumferentially distributed parallel slots. One conductor side of each conductor section is inserted at least partially into a corresponding slot of the parallel slots. The other conductor side of each conductor section is positioned, one beside the other, along the stator frame. The other conductor sides are then circumferentially shifted with respect to the stator frame until the other conductor sides are superimposed respectively above the one conductor side for forming pairs of superimposed conductor sides. Thereafter, a force is applied onto the other conductor sides along a radial direction of the circular stator frame for inserting the pairs of superimposed conductor sides completely into the corresponding slots.

4 Claims, 23 Drawing Sheets

METHOD FOR MOUNTING CONDUCTOR SECTIONS ONTO A STATOR FRAME OF A DYNAMOELECTRIC MACHINE

This application is a division, of application Ser. No. 08/264,504, filed Jun. 23, 1994.

FIELD OF THE INVENTION

The invention relates to a stator of a dynamoelectric machine and to a method for mounting at least one stator winding onto a circular shaped stator frame. More specifically, the invention relates to dynamoelectric machine which can be a motor or a generator.

The machine can be provided with either inner rotor or outer rotor. More specifically, the invention relates to stator windings having conductors of rectangular cross section.

BACKGROUND OF THE INVENTION

Known in the art, there is the U.S. Pat. No. 3,453,468, granted on Jul. 1, 1979 to W. W. Lund. In this patent, there is described a two-layer winding arrangement for a dynamoelectric machine stator core having a plurality of coils wherein each phase group coils are series connected and formed from a single continuous conductor and wherein each coil consists of a single turn. The cross section of the conductor is rectangular so that the slots of the stator which are also rectangular can be almost completely filled. This is not the case with conductor having a circular cross section. The drawback with this kind of machine is that the heads of the turn which are the part of the conductor that forms a bridge from one slot to the other are quite big and long with respect to the stator core. Because of that, the machine is heavier and there is more heat loss.

Also known in the art, there are the following U.S. patent:
U.S. Pat. No. 693,578
U.S. Pat. No. 3,914,860
U.S. Pat. No. 4,321,497
U.S. Pat. No. 4,346,320
U.S. Pat. No. 5,056,922

One drawback with all of the above mentioned patents is that none of the above patents provides a stator for dynamoelectric machine with windings of rectangular cross section, made of series connected multiple turns where each turns has heads which are substantially small with respect to the stator core.

An object of the present invention is to provide a stator for a dynamoelectric machine having windings of rectangular cross section where the heads of the turns of the stator windings are smaller than the ones described in the prior art so that the dynamoelectric machine be lighter and generate less heat when it is operating.

It is also an object of the present invention to provide a method for mounting at least one stator winding onto a circular shaped stator frame of a dynamoelectric machine.

SUMMARY OF THE INVENTION

According to the present invention, there is provided a conductor section for a stator frame of a polyphase dynamoelectric machine, said stator frame being provided with a series of elongated parallel slots for receiving respectively conductor sections, said conductor section comprising:

two parallel conductor sides of substantially rectangular cross section adapted to fit respectively into two corresponding parallel slots of said stator frame, said two sides defining a plane; and at least one conductor head of substantially rectangular cross section, connecting two adjacent ends of said parallel sides, said head showing a substantially U-shaped body when seen from a top view perpendicular to said plane, and a waved-shape body when seen from a front view contained in said plane, said head having top and bottom surfaces facing only one side of said plane from one end of said head to the other end thereof.

According to the present invention, there is also provided a method for mounting conductor sections of stator winding onto a circular shaped stator frame of a dynamoelectric machine, each of said conductor sections having two parallel conductor sides and at least one conductor head connecting two adjacent ends of said parallel sides, said stator frame being provided with circumferentially distributed parallel slots, comprising steps of:

a) circumferentially positioning said conductor sections with respect to said stator frame, one conductor side of each conductor section immediately facing one of said slots, the other conductor side of each conductor section being disposed at a remote position from said stator frame;

b) after said step (a), inserting said one conductor side of each conductor section into the corresponding slot; and c) inserting the other conductor side of each conductor section into an other of said slots, which has already received one conductor side of another conductor section, until all of said sides are mounted in said slots.

According to the present invention, there is also provided a method for mounting conductor sections of a stator winding onto a circular shaped stator frame of a dynamoelectric machine, each of said conductor sections having two parallel conductor sides and at least one conductor head connecting two adjacent ends of said parallel sides, said stator frame being provided with circumferentially distributed parallel slots, comprising steps of:

a) inserting one conductor side of each conductor section at least partially into a corresponding slot of said parallel slots;

b) positioning the other conductor side of each conductor section one beside the other along said stator frame;

c) after said steps (a) and (b), circumferentially shifting said other conductor sides with respect to said stator frame until said other conductor sides are superimposed respectively above said one conductor sides for forming pairs of superimposed conductor sides; and d) after said step (c), applying a force onto said other conductor sides along a radial direction of said circular stator frame for inserting said pairs of superimposed conductor sides completely into the corresponding slots.

The objects, advantages and other features of the present invention will become more apparent upon reading up of the following non restrictive description of preferred embodiments thereof given for the purpose of exemplification only with reference to the accompanying drawings.

DETAILED DESCRIPTION OF THE DRAWINGS

In the following description, similar elements are identified by the same reference number in all the drawings. Referring now to FIGS. 1 to 8, there is shown a conductor section 2 for a stator frame 4 of a polyphase dynamoelectric machine. The stator frame 4 is provided with a series of elongated parallel slots for receiving respectively conductor sections as it is known in the art. The conductor section 2 comprises two parallel conductor sides 6 and 8 of substantially rectangular cross section adapted to fit respectively into two corresponding parallel slots of the stator frame 4. The two sides 6 and 8 defines a plane which is the plane of the sheet onto which FIG. 1 appears.

Figure 4:
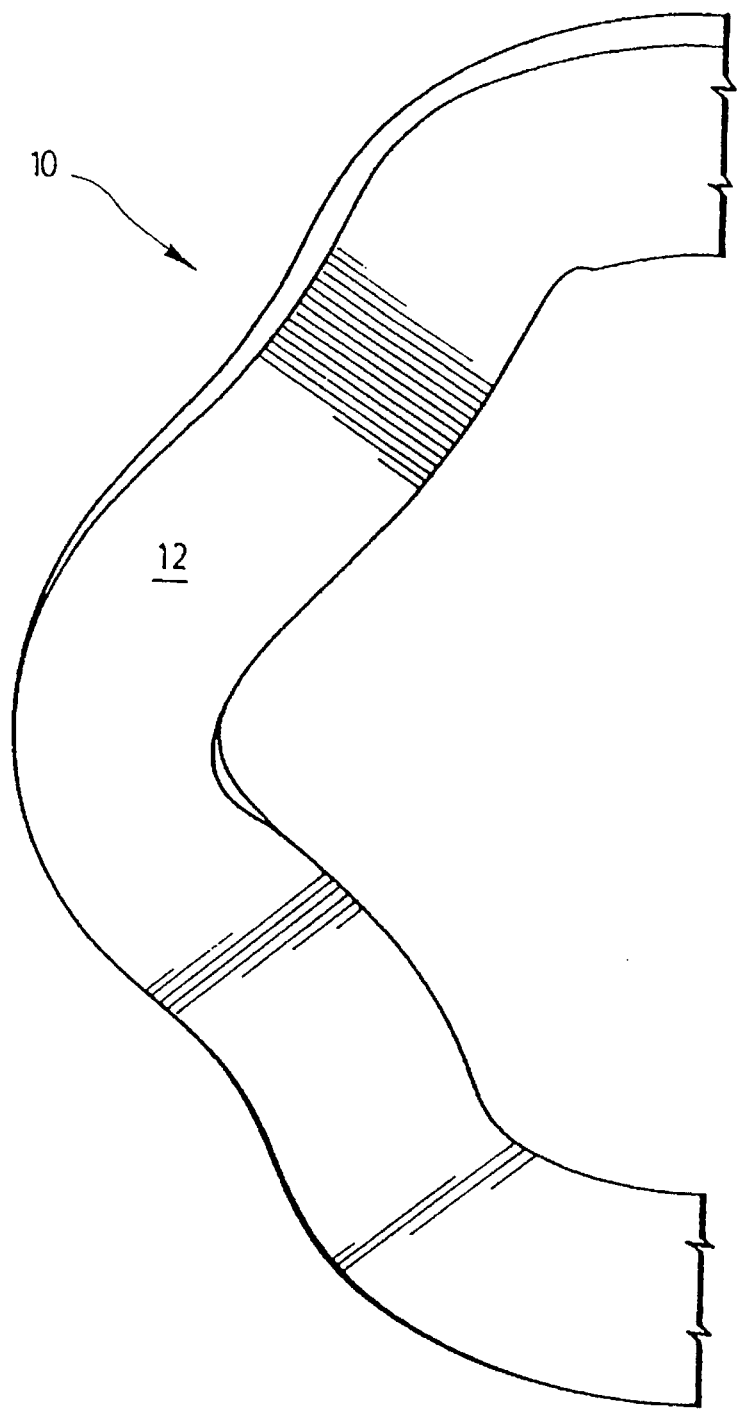
FIG. 4 is a top view of one conductor head of the conductor section shown in FIGS. 1, 2, and 3.
Figure 5:
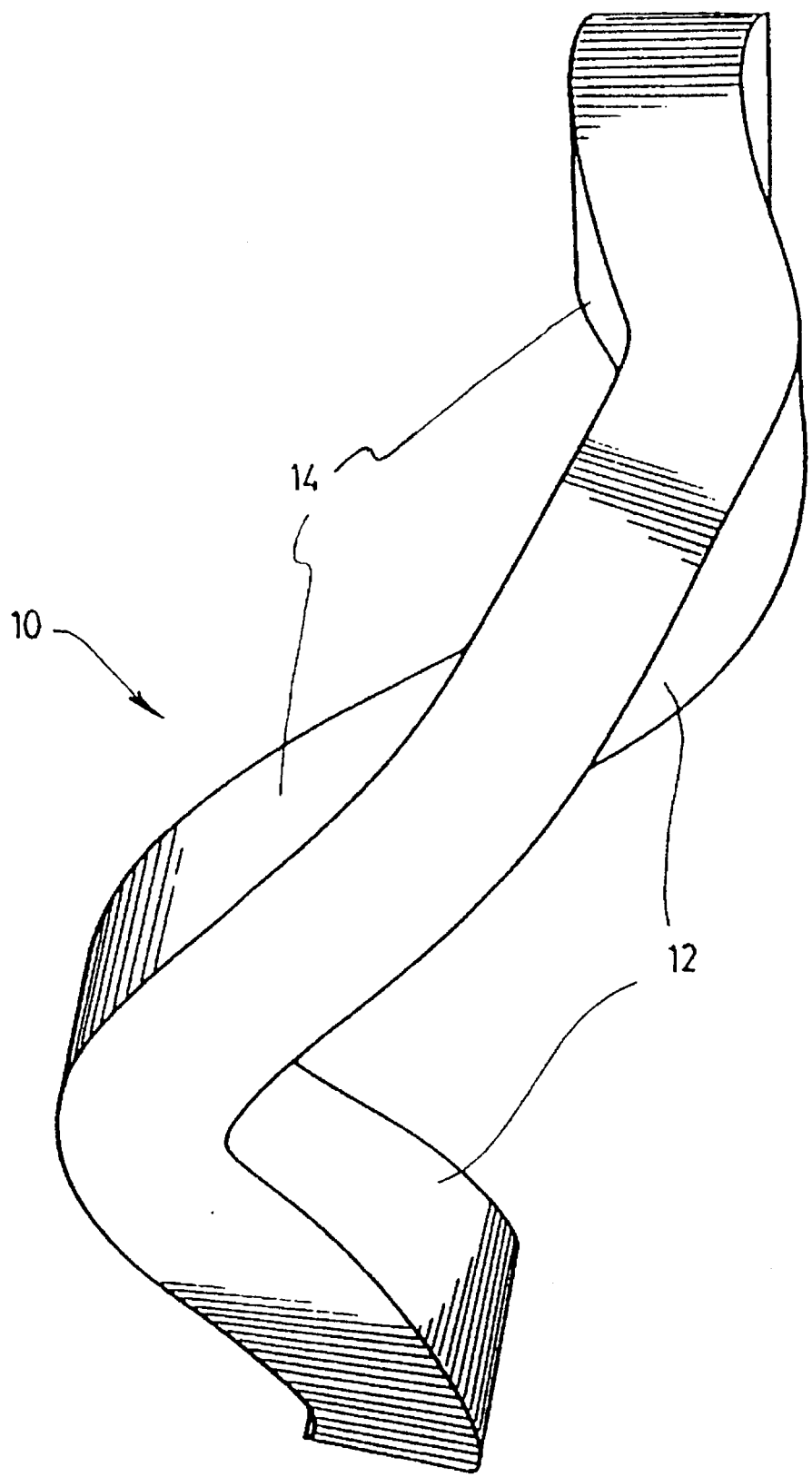
FIG. 5 is a front view of the conductor head shown in FIG. 4.
Figure 6:
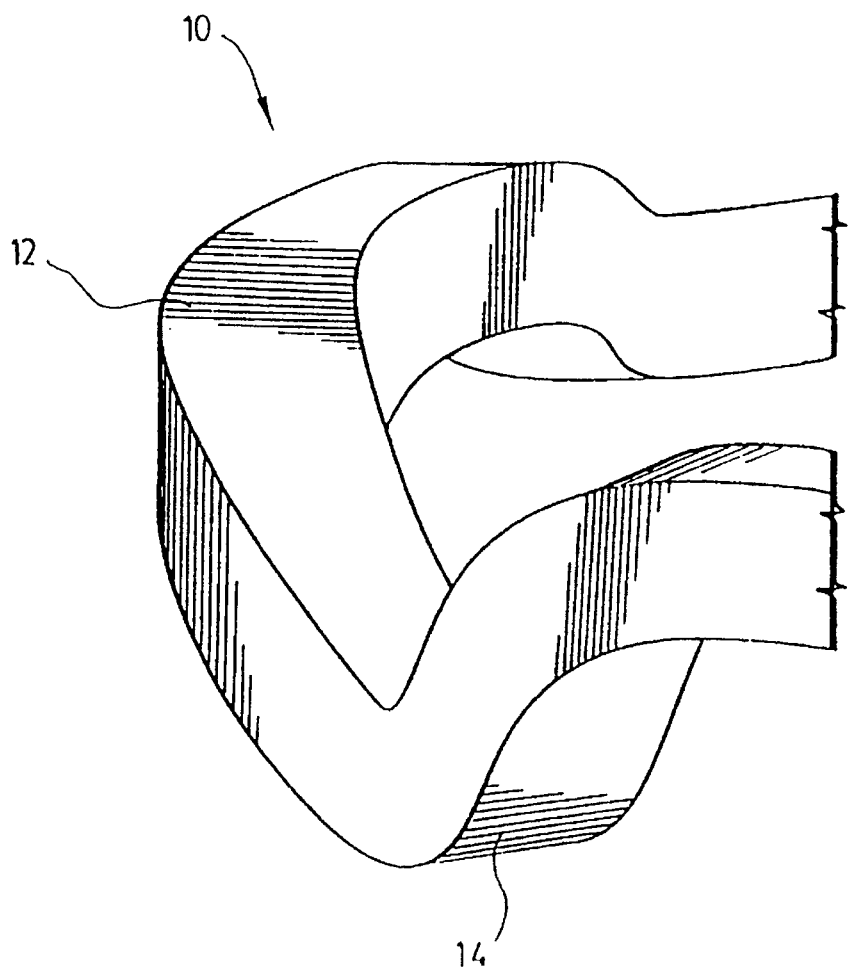
FIG. 6 is a side view of the conductor head shown in FIGS. 4 and 5.

The conductor section 2 also comprises at least one conductor head 10 of substantially rectangular cross section, connecting two adjacent ends of the parallel sides 6 and 8. More specifically the conductor section 2 shown in FIGS. 1 to 8 has two conductor heads 10. The head 10 shows a substantially U-shaped body when seen from a top view perpendicular to said plane, as shown in FIG. 4, and a waved-shape body when seen from a front view contained in said plane, as shown in FIG. 5.

The head 10 has top and bottom surfaces 12 and 14 facing only one side of the plane from one end of the head 10 to the other end thereof.

In the prior art, the windings of a motor is usually made of conductors of circular cross section. With such conductors of rectangular cross section, the filling of the slots into which the conductors are mounted determines a filling factor in the order of 50% to 55%. The efficiency of the machine depends directly on this filling factor. To improve the filling factor, a conductor of rectangular cross section is proposed.

Figure 1:
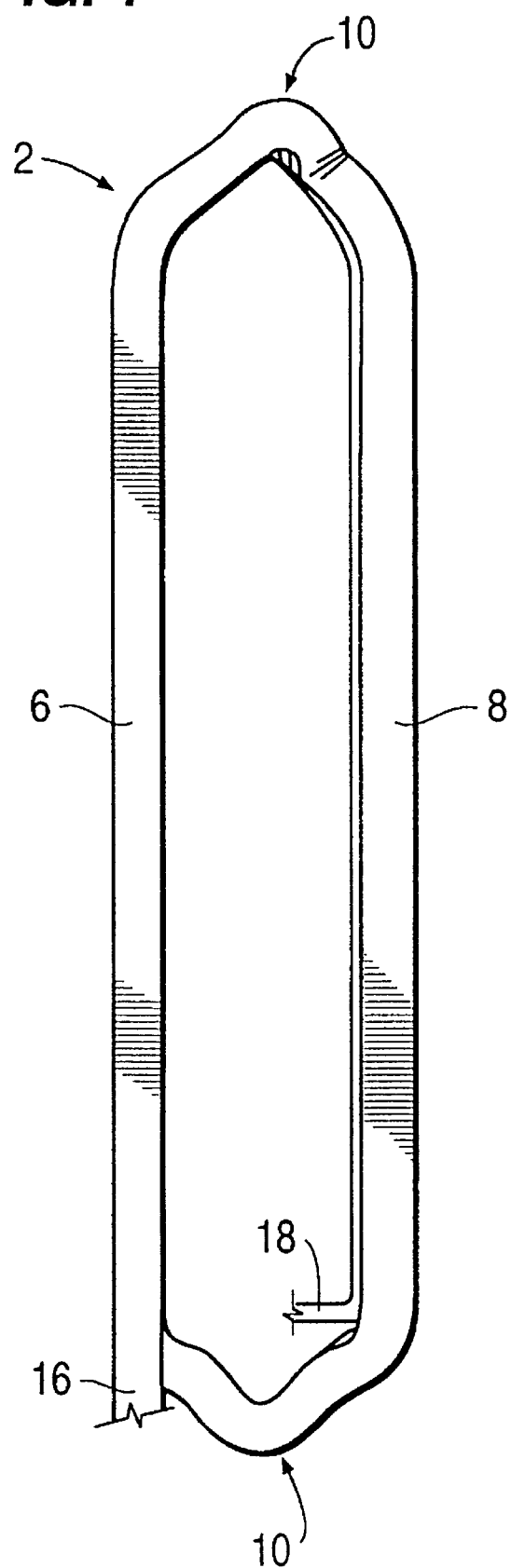
FIG. 1 is a top view of a conductor section according to the present invention.
Figure 2:
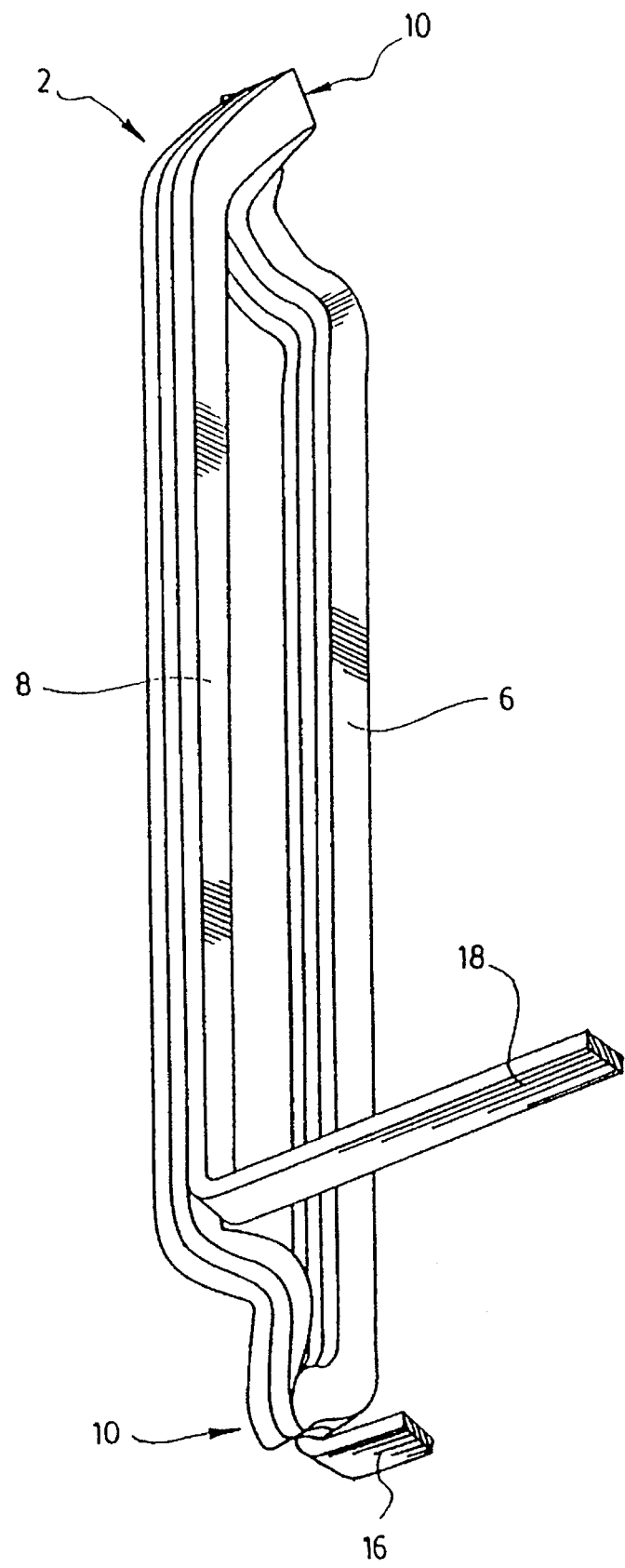
FIG. 2 is a perspective view of the conductor section shown in FIG. 1.
Figure 3:
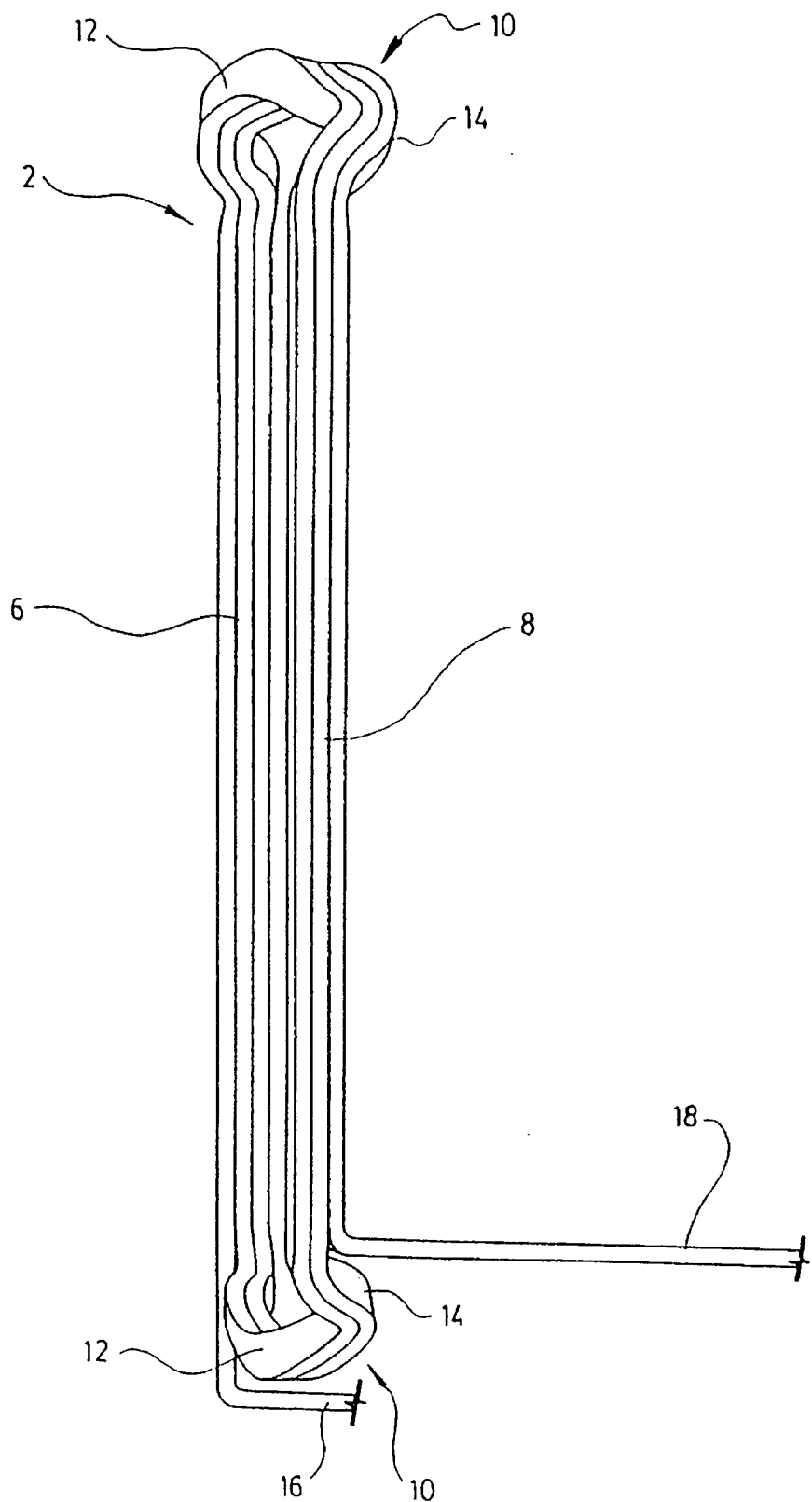
FIG. 3 is a side view of the conductor section shown in FIG. 1.

In the prior art, motor windings made of conductors of rectangular cross section are known but the heads of the coils mounted in the slots are quite big as it can be seen in FIG. 1 of U.S. Pat. No. 3,453,468.

To overcome the above mentioned problem, a conductor section having at least one head as described above is proposed according to the present invention to obtain, at the same time, a conductor section having a filling factor in the order of 80% and a conductor section having a conductor head which is smaller than the conductor head of the prior art. With smaller heads it is possible to reduce the weight of material which is usually copper, and the heat loss produced by the current circulating in the conductor. Also with smaller conductor heads it is possible to obtain a narrower motor.

Preferably, the waved-shaped body of the head is asymmetrical.

Preferably, the conductor section 2 is constituted of at least one turn to form a coil. The heads 10 of one conductor section 2 are constituted of two opposite heads located respectively at opposite ends of said two parallel sides 6 and 8.

Preferably, each conductor section 2 comprises two connecting ends 16 and 18 for connecting the conductor section 2 in series with other conductor sections 2. The two connecting ends 16 and 18 of each conductor section are formed at one of the heads thereof.

Preferably, each conductor section is constituted of several turns.

Figure 13:
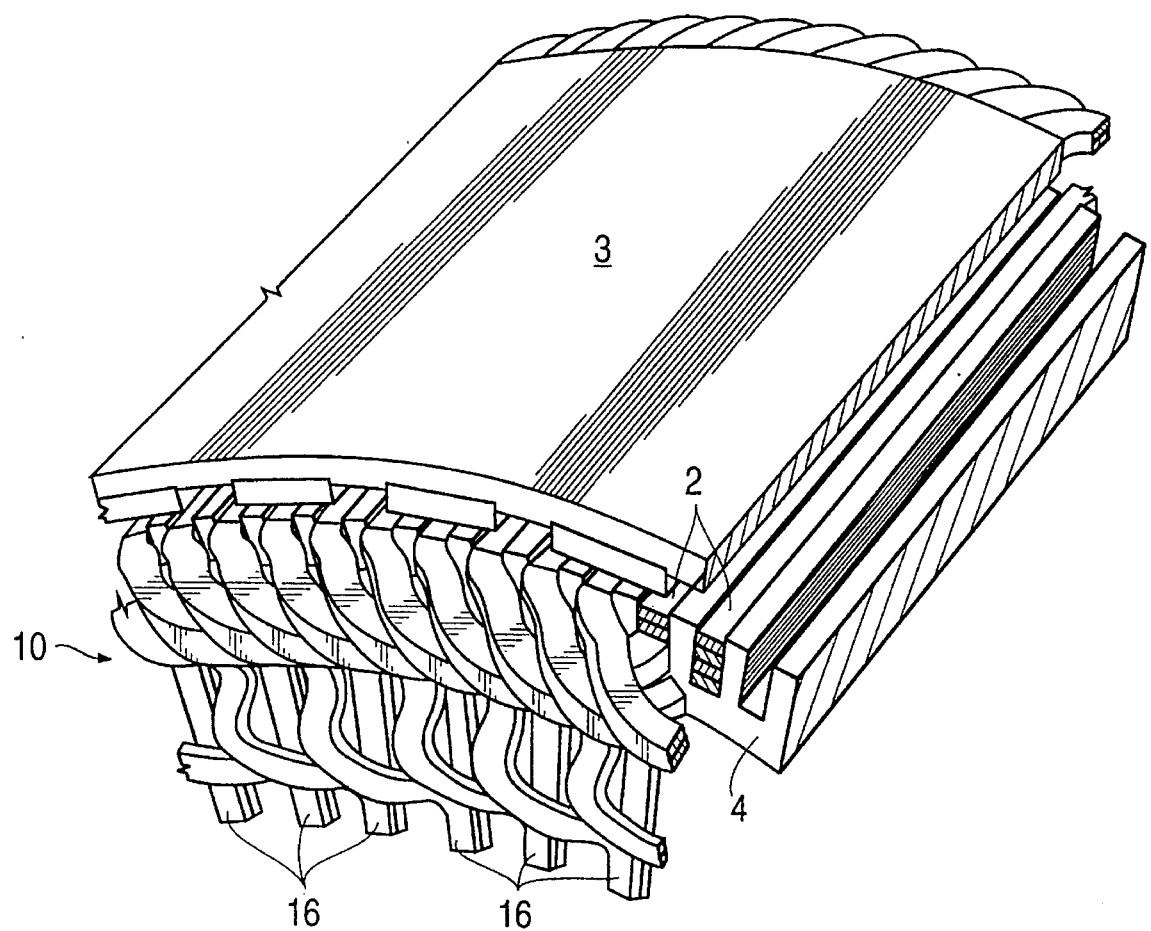
FIG. 13 is a partial front perspective view of a plurality of conductor sections in combination with a stator frame in compliance with the present invention.
Figure 14:
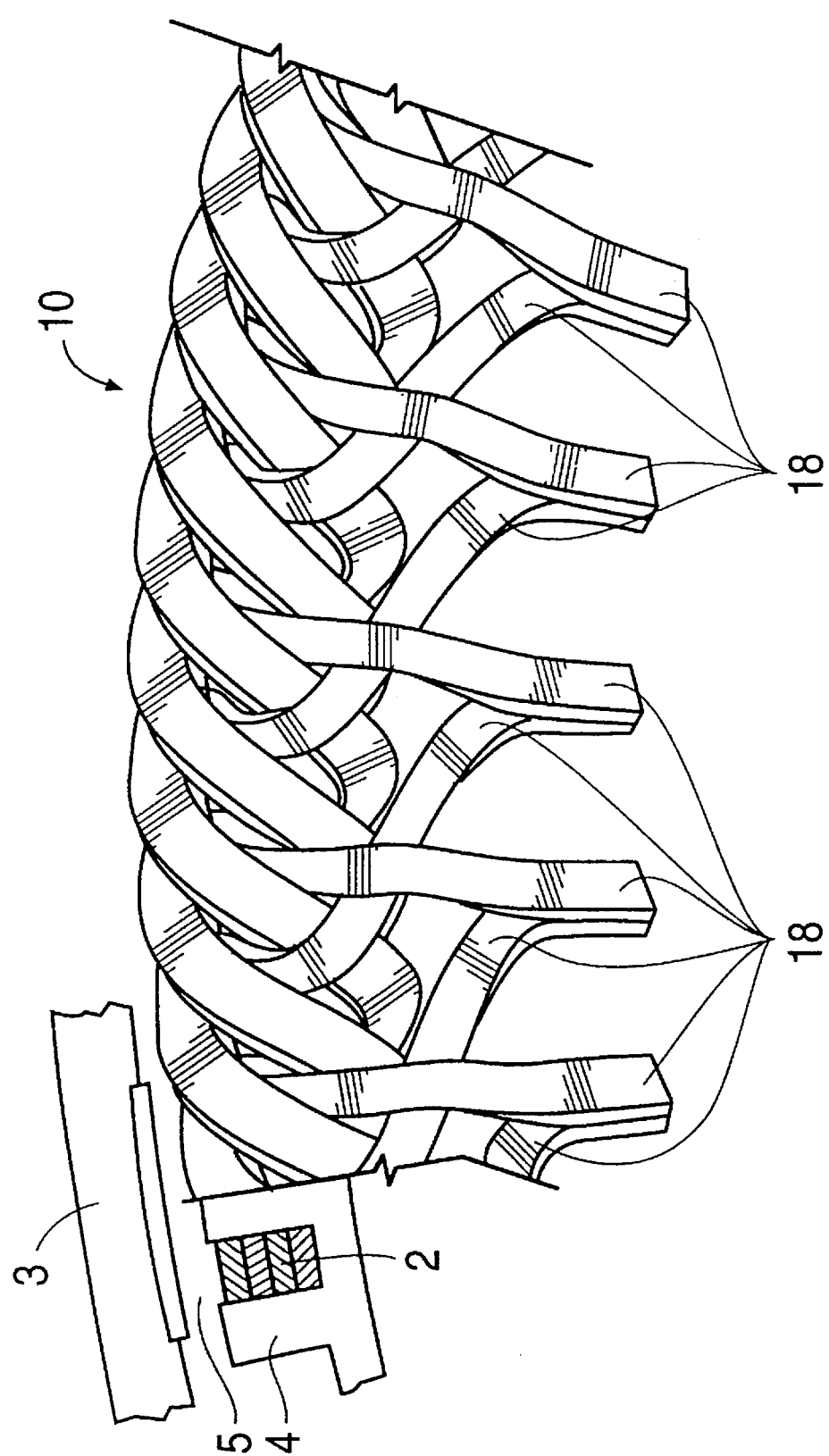
FIG. 14 is a back view of the plurality of conductors sections shown in FIG. 13.
Figure 15:
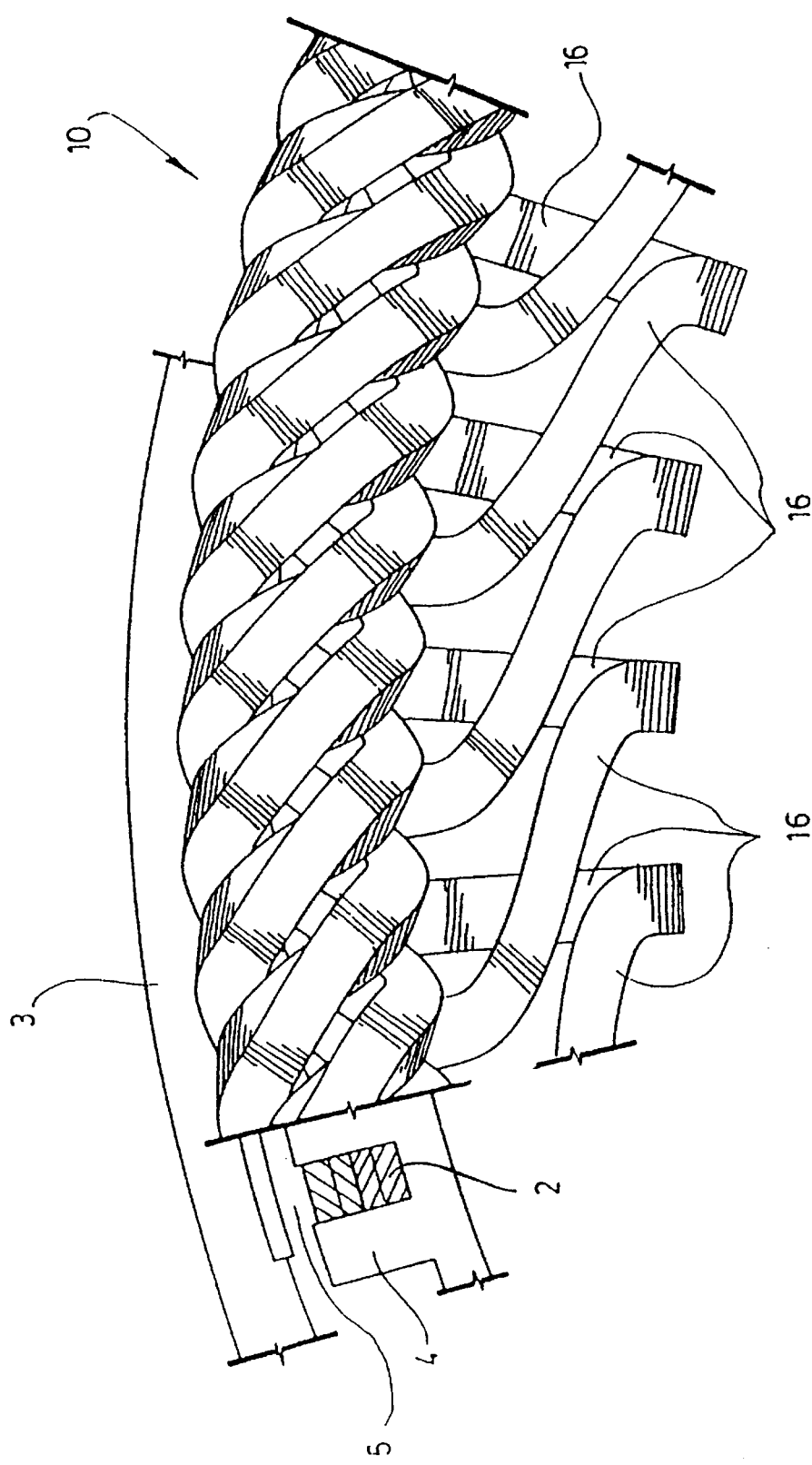
FIG. 15 is a back view of the plurality of conductor sections shown in FIG. 13.

Referring now to FIGS. 13, 14 and 15, there are shown a plurality of conductor sections 2 in combination with the stator frame 4. The stator frame 4 is a circular shaped stator frame provided with circumferentially distributed parallel slots. The frame 4 has a surface adjacent to a rotor 3 of the machine when the machine is assembled. The frame 4 is separated from the rotor by an air gap 5. Referring now more specifically to FIG. 14, there is shown that the heads 10 of each conductor section 2 has a portion projecting within said air gap.

Referring again to FIGS. 13, 14 and 15, the conductor sections 2 are connected in series to form at least two stator windings. In the present case, there are three stator windings. The two sides of each conductor section 2 are respectively fitted into two corresponding parallel slots of the stator frame 4. The portion of each head on the side of the machine shown in FIG. 14 projects within the air gap 5 along a distance inferior to the width thereof to allow the rotor 3 to be axially slidden with respect to the stator frame 4 when the machine is being assembled.

Preferably, the slots have substantially rectangular cross sections.

Preferably, the slots are outer circumferentially distributed parallel slots, and consequently the surface of the stator frame 4, adjacent to the rotor 3 is an outer peripheral surface so that the rotor 3 is disposed around the stator frame 4 when the machine is assembled.

Figure 7:
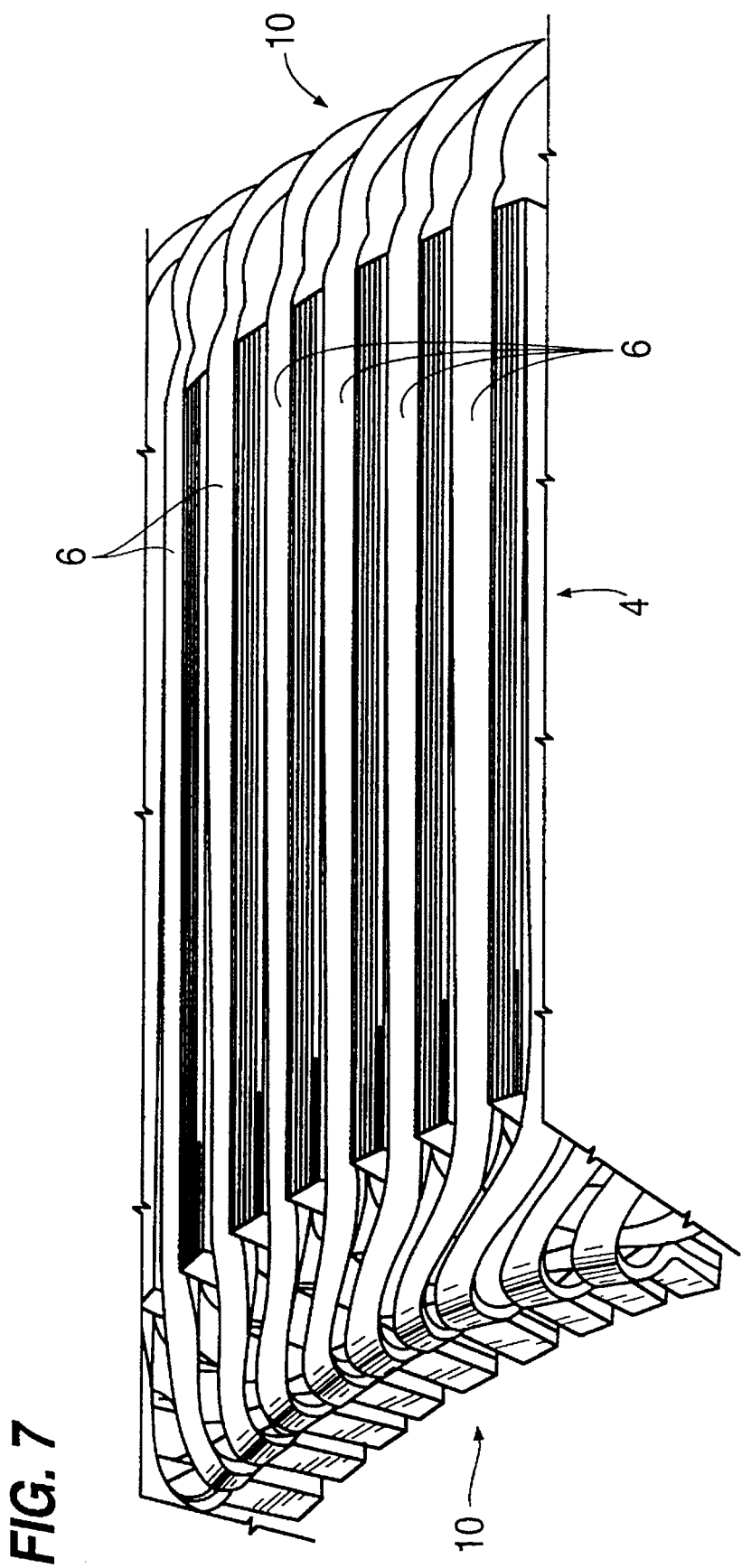
FIG. 7 is a partial perspective view of a plurality of conductor sections in combination with a stator frame in accordance with the present invention.
Figure 8:
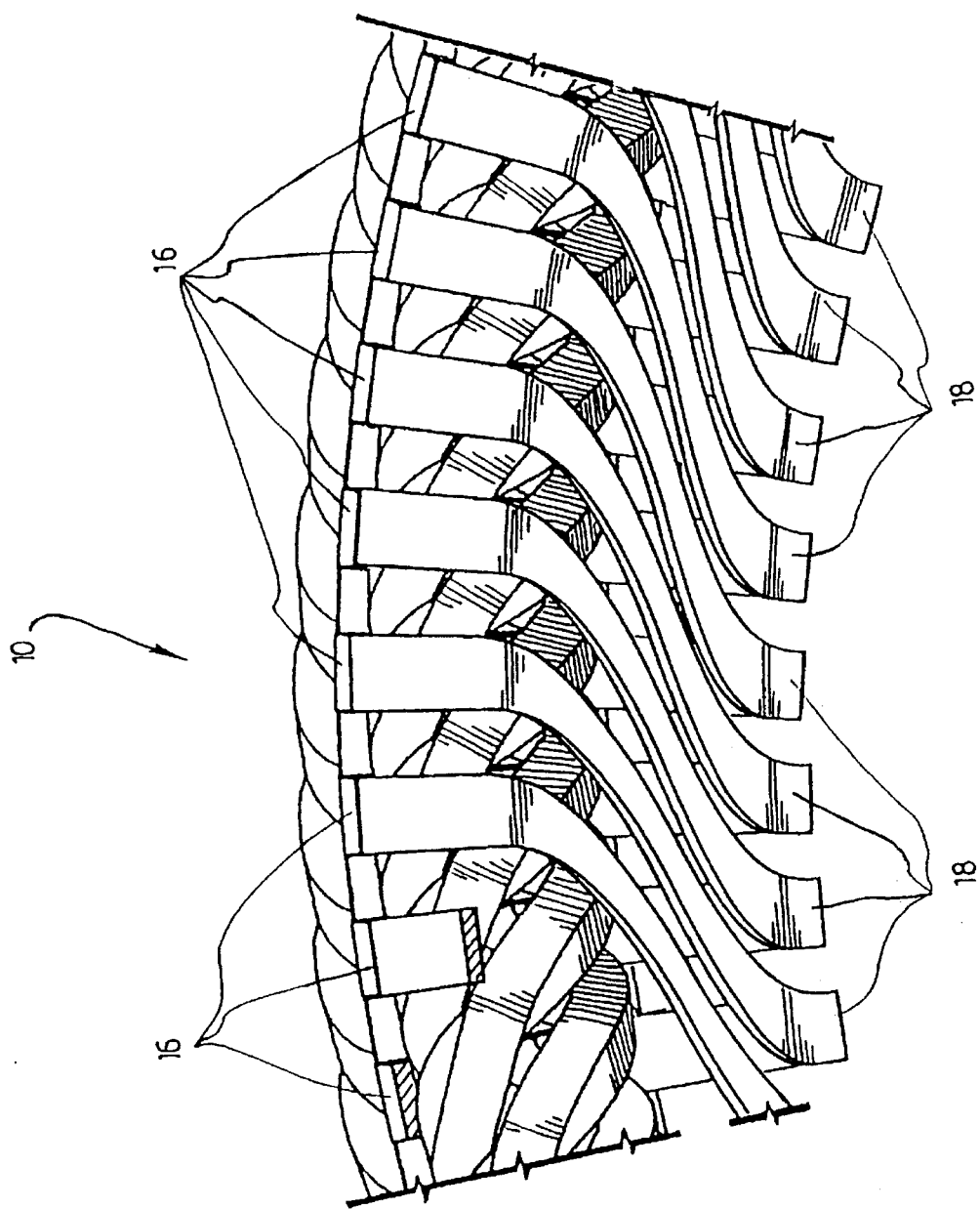
FIG. 8 is a front view of the plurality of conductor sections in combination with a stator frame, shown in figure seven.
Figure 9:
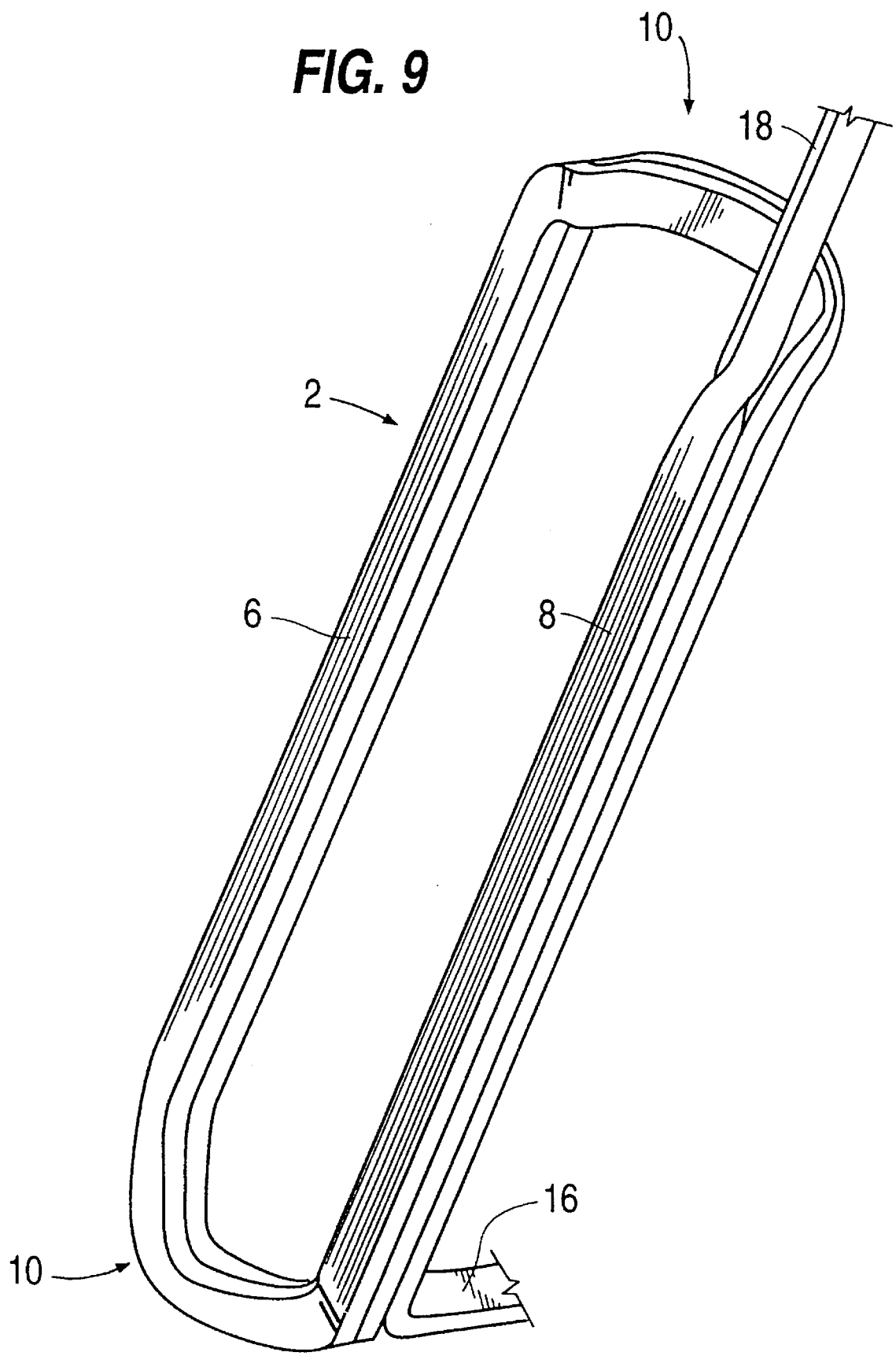
FIG. 9 is perspective view of an other conductor section in accordance with the present invention.
Figure 10:
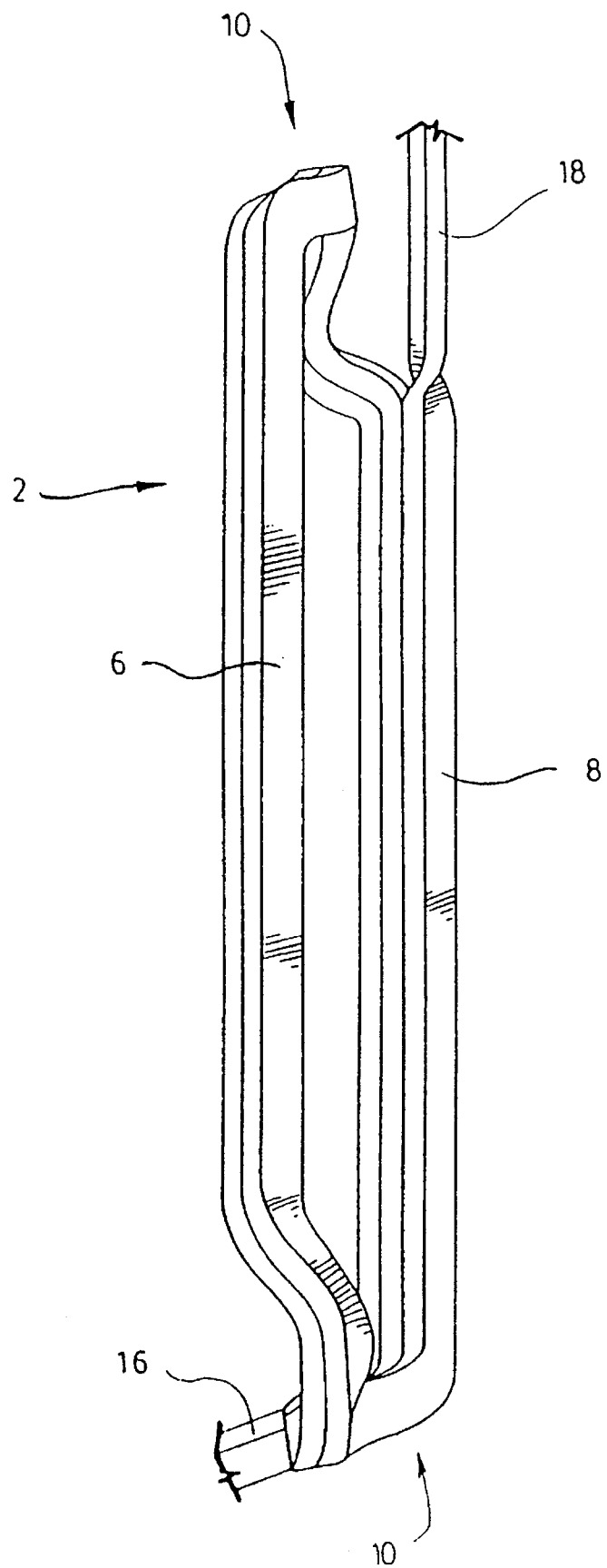
FIG. 10 is another perspective view of the conductor section shown in FIG. 9.
Figure 17:
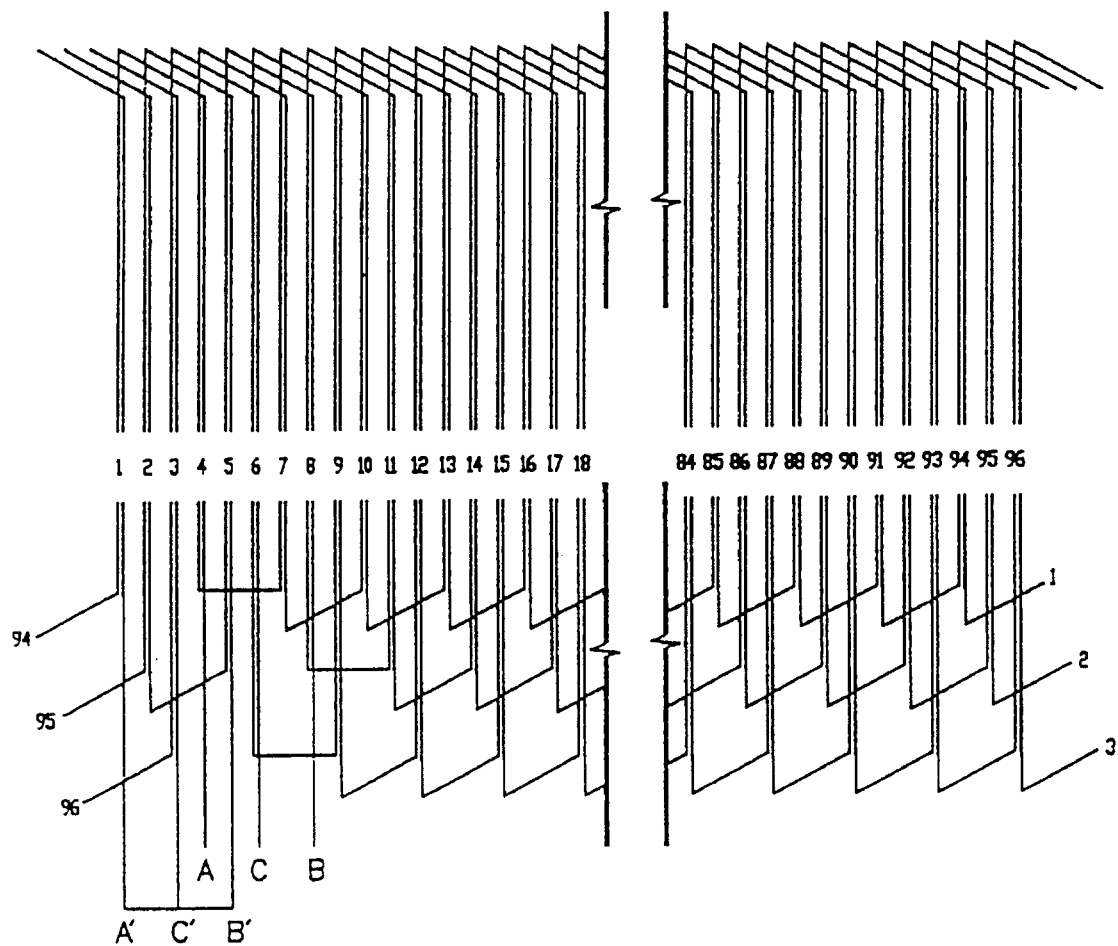
FIG. 17 is an electric circuit showing the connections of a plurality of conductor sections.

Referring now to FIGS. 7, 8 and 17, preferably the stator windings comprise three stator windings so that the machine is a three phase machine.

It can be seen that the conductor sections are electrically connected in series to obtain three stator windings. Accordingly, each of the heads has its two sides disposed three slots away from each other.

Referring now more specifically to FIG. 17, preferably, the stator frame is provided with ninety six slots. The three stator windings are supplied by a three phase voltage A, B and C.

Referring now to 9 to 15, preferably, there is shown that each conductor section 2 comprises two connecting ends 16 and 18 for connecting it in series with other conductor sections 2. The two connecting ends 16 and 18 of each conductor section 2 are formed respectively at the two opposite heads thereof.

Figure 11:
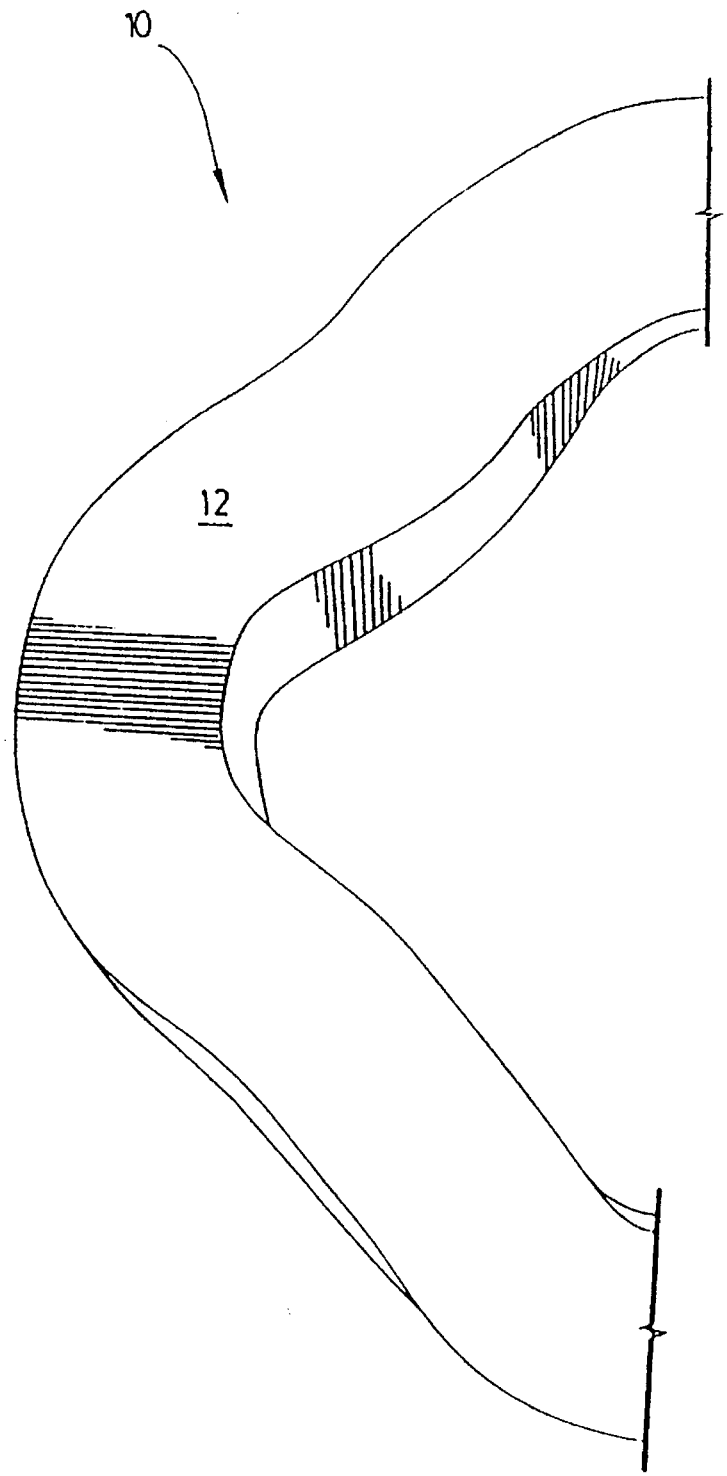
FIG. 11 is a top view of one conductor head of the conductor section shown in FIGS. 9 and 10.
Figure 12:
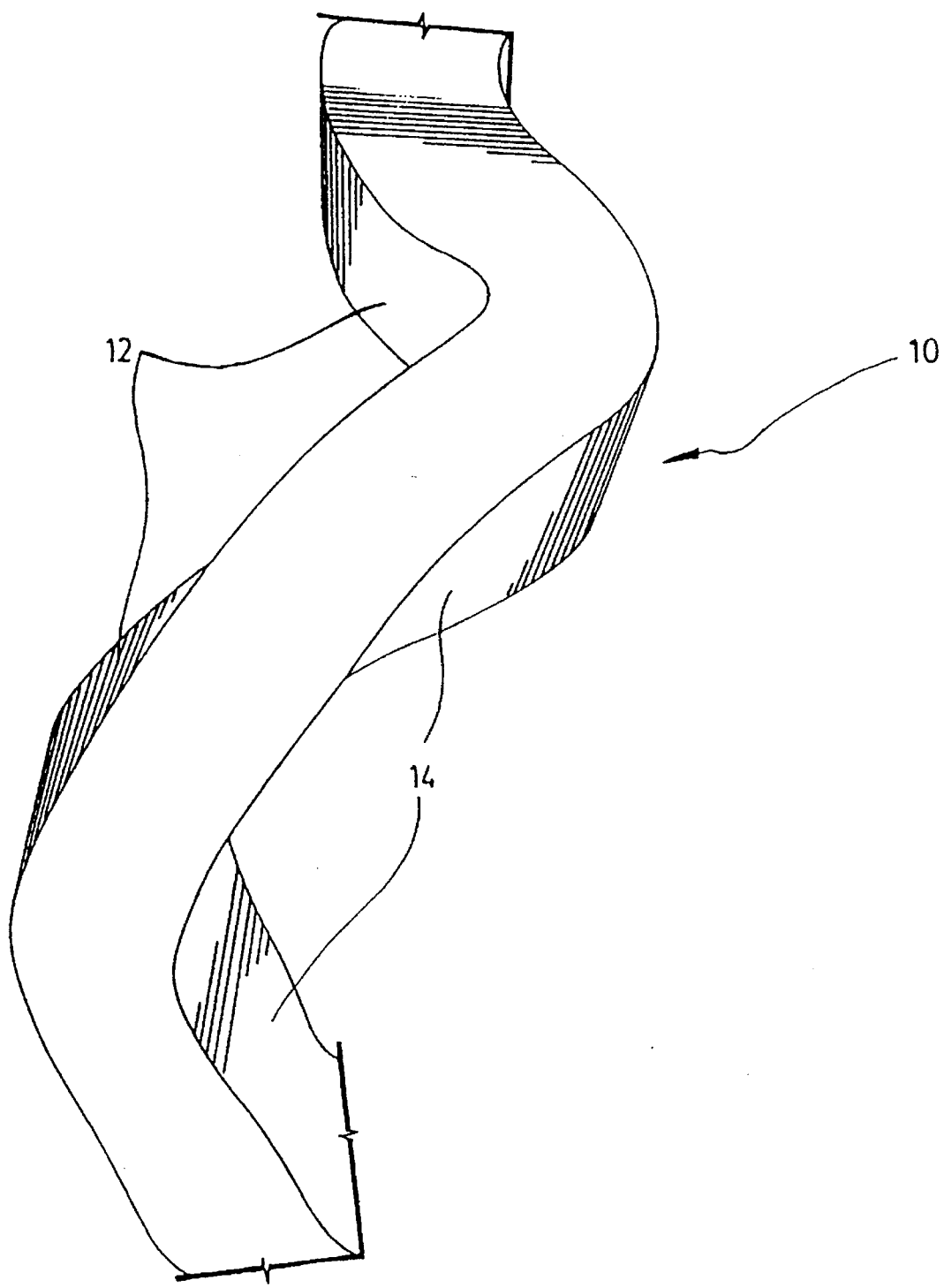
FIG. 12 is a front view of the conductor head shown in FIG. 11.
Figure 16:
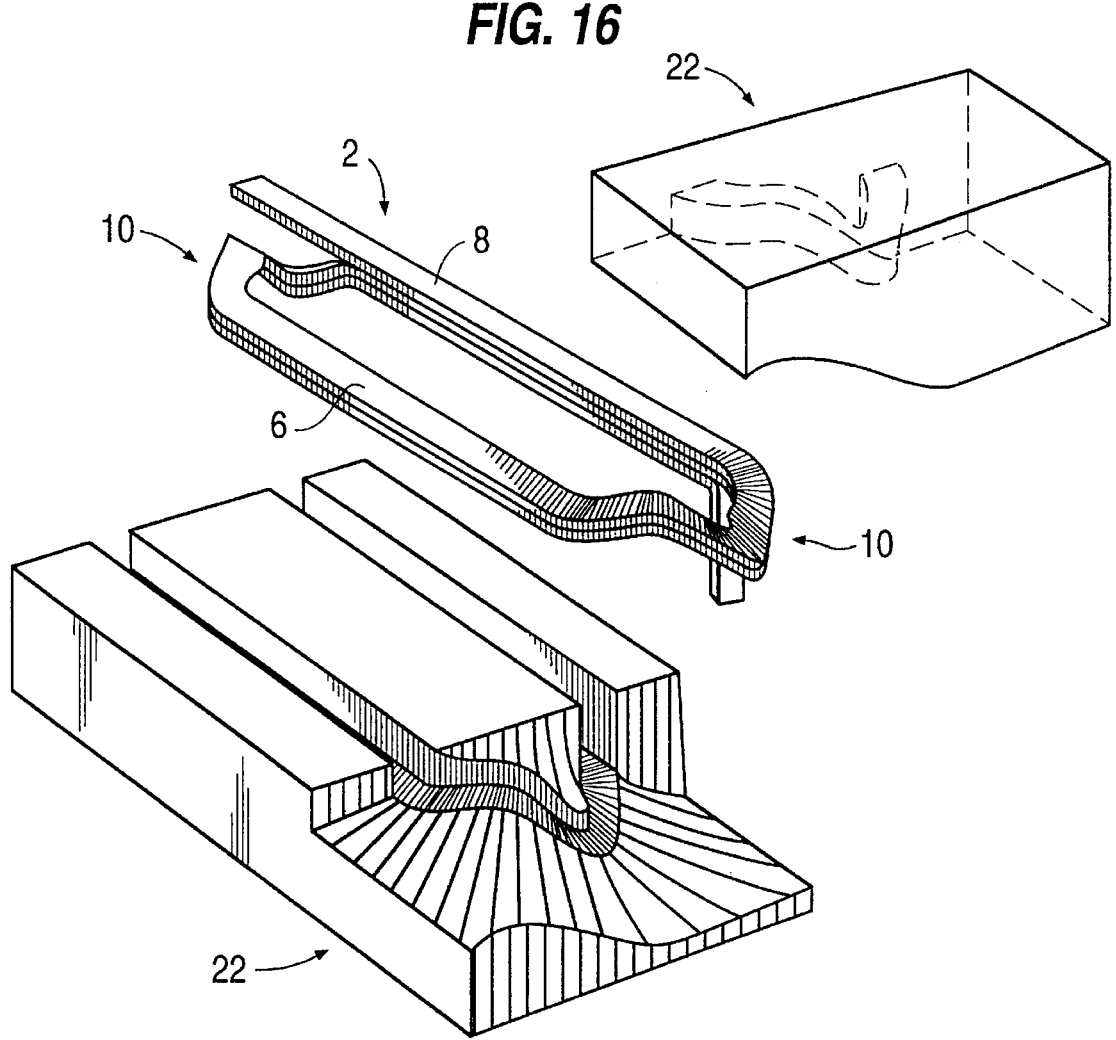
FIG. 16 is a perspective exploded view of a two part mould with a conductor section in accordance with the present invention.

Referring now to FIG. 16, there is shown a two part mould 22 for forming one head 10 of the conductor section 2 so that each head 10 shows substantially an U-shaped body, as seen in FIGS. 4 and 11, and a waved-shape body, as seen in FIGS. 5 and 12.

Referring now to FIGS. 18 to 21, there is shown a method for mounting conductor sections 2 of stator winding onto a circular shaped stator frame 4 of a dynamoelectric machine. Each of the conductor sections 2 has two parallel conductor sides 6 and 8. Two opposite conductor heads connect respectively the two adjacent ends of the parallel sides 6 and 8. The stator frame 4 is provided with circumferentially distributed parallel slots.

Figure 18:
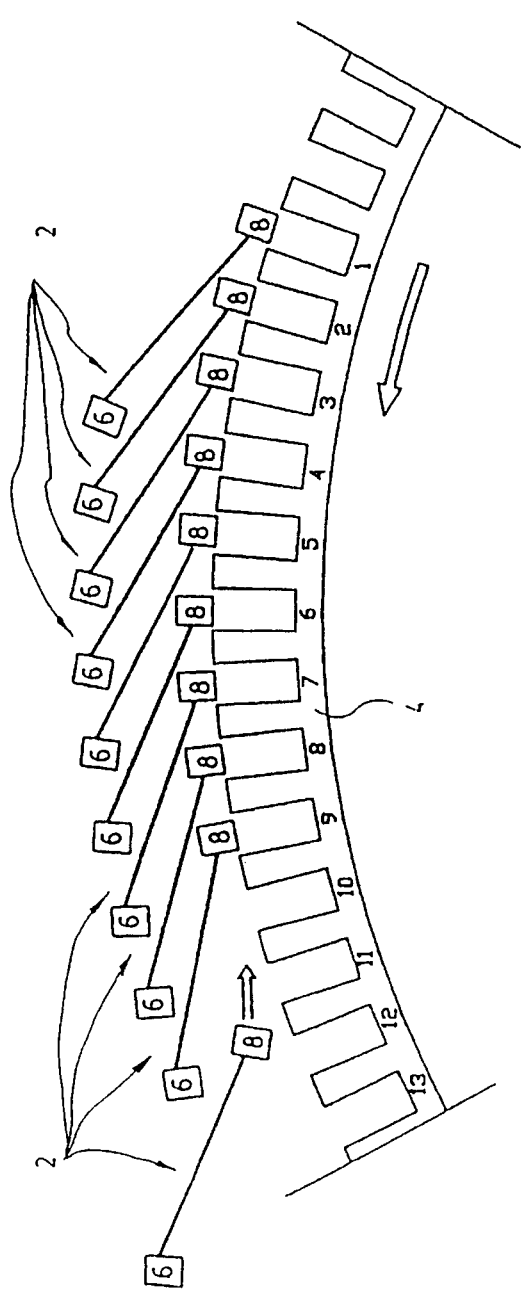
FIGS. 18, 19, 20 and 21 are partial schematic side views of conductor sections with respect to a stator frame, showing different steps of a method for mounting the conductor sections onto a circular shaped stator frame.
Figure 19:
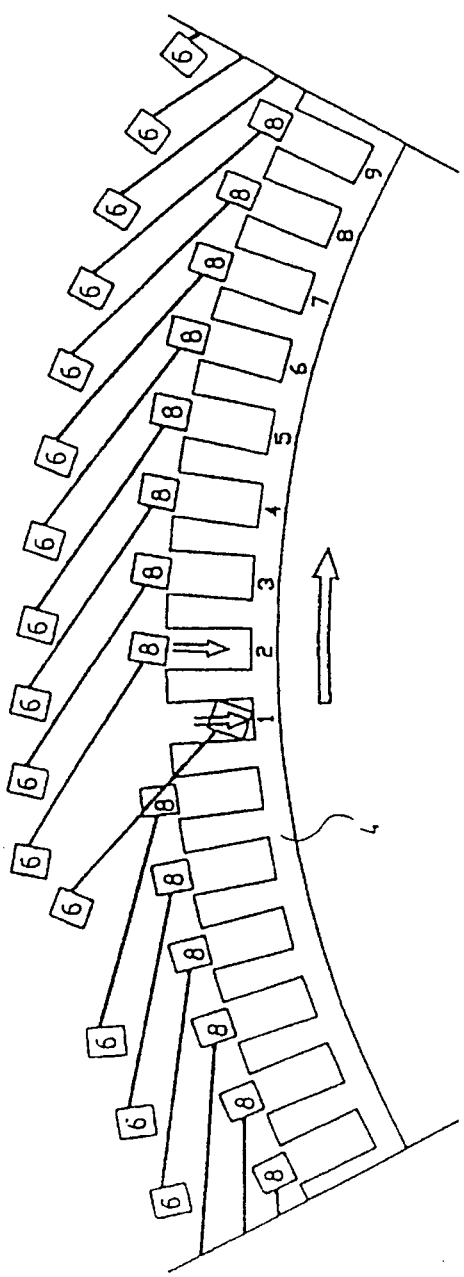
Figure 20:
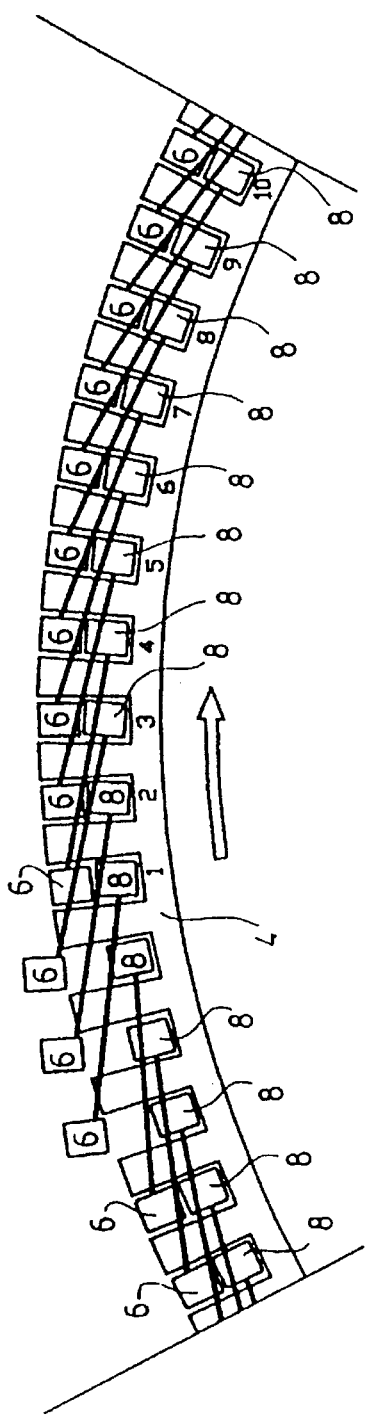
Figure 21:
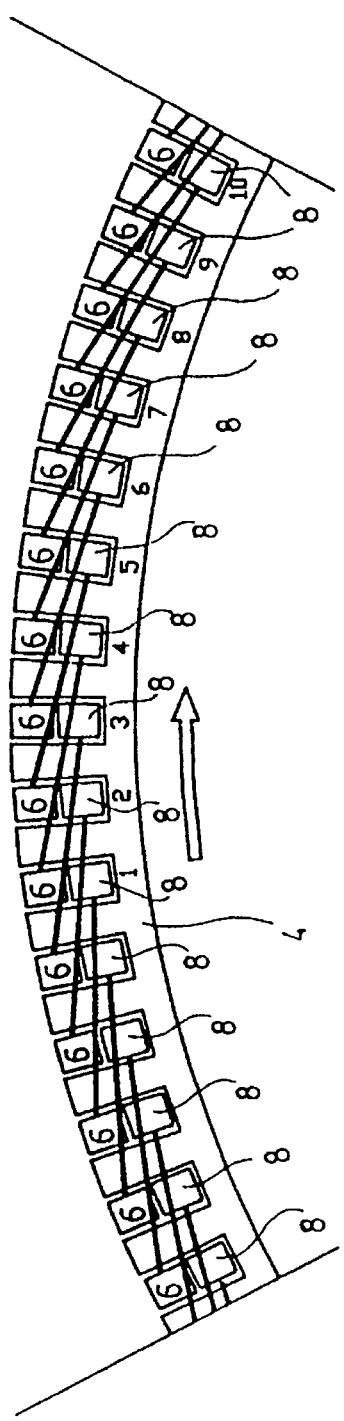

The method comprises steps of (a) circumferentially positioning the conductor sections 2 with respect to the stator frame 4, as shown in FIG. 18, one conductor side 8 of each conductor section 2 immediately facing one slot of the frame 4, the other conductor side 6 of each conductor section 2 being disposed at a remote position from said stator frame 4; after step (a), (b) inserting one conductor side 8 of each conductor section 2 into the corresponding slot, as shown in FIG. 19; and (c) inserting the other conductor side 6 of each conductor section 2 into another slot, which has already received one conductor side 8 of another conductor section 2, as shown in FIG. 20, until all of said sides 6 and 8 are mounted in the slots of the frame 4, as shown in FIG. 21.

Preferably, in step (a), the conductor sections 2 are positioned, one after the other, starting from one point and moving sequentially along the stator frame 4.

Preferably, in step (b), the sides 8 of the conductor sections 2 are inserted, one after the other, starting from one point and moving sequentially along the stator frame 4. Preferably, in step (c), each head has its two sides 6 and 8 disposed three slots away from each other.

Figure 26:
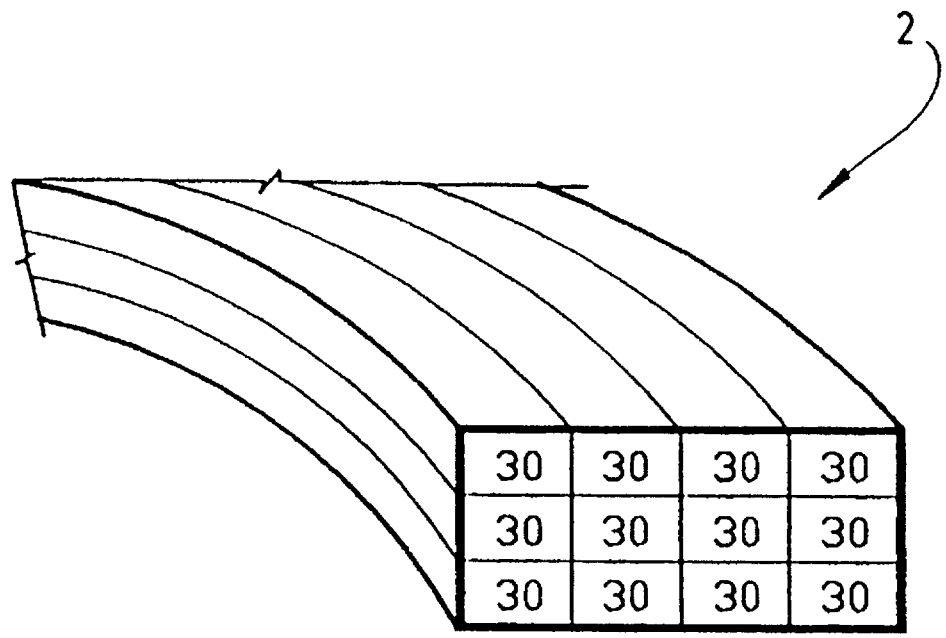
FIG. 26 is a perspective view showing the end of a conductor section in accordance with the present invention.

Referring now to FIG. 26, there is shown a conductor section 2 made of several adjacent and parallel conductors 30 of rectangular cross section.

Referring now to FIGS. 22 to 25, there is shown another method for mounting conductor sections 2 of a stator winding onto a circular shaped stator frame 4 of a dynamoelectric machine, each conductor section 2 has two parallel conductor sides 6 and 8, and two opposite conductor heads connecting respectively two adjacent ends of the parallel sides 6 and 8. The stator frame 4 is provided with circumferentially distributed parallel slots.

Figure 22:
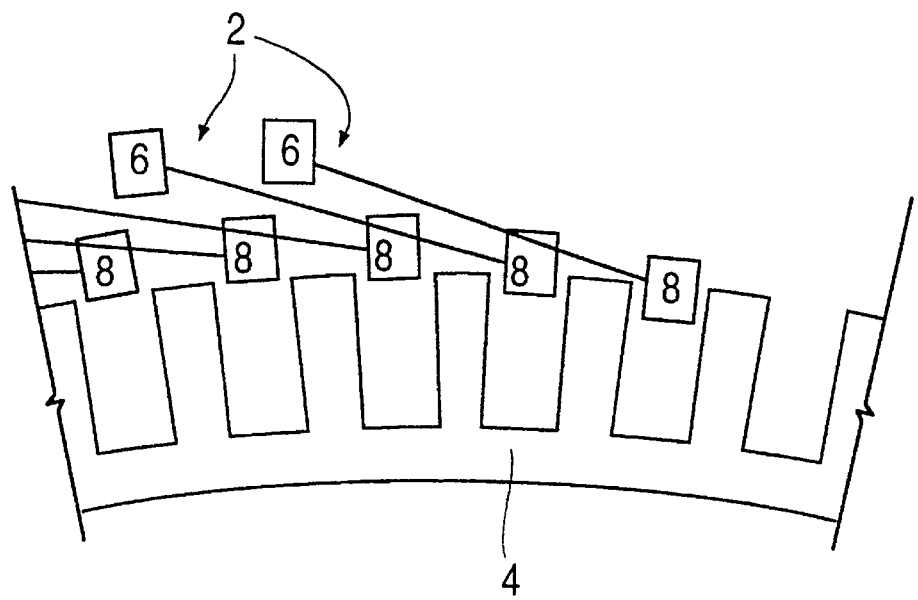
FIGS. 22, 23, 24 and 25 are partial schematic side views showing conductor sections with respect to a stator frame, illustrating the step of an other method for mounting conductor sections onto a circular shaped stator frame.
Figure 23:
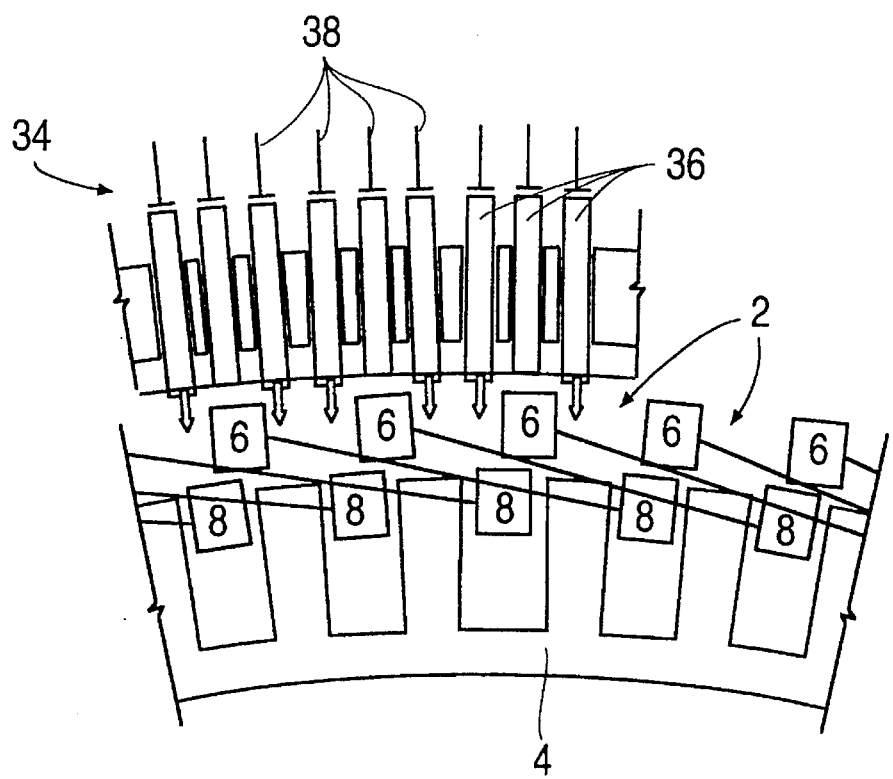
Figure 24:
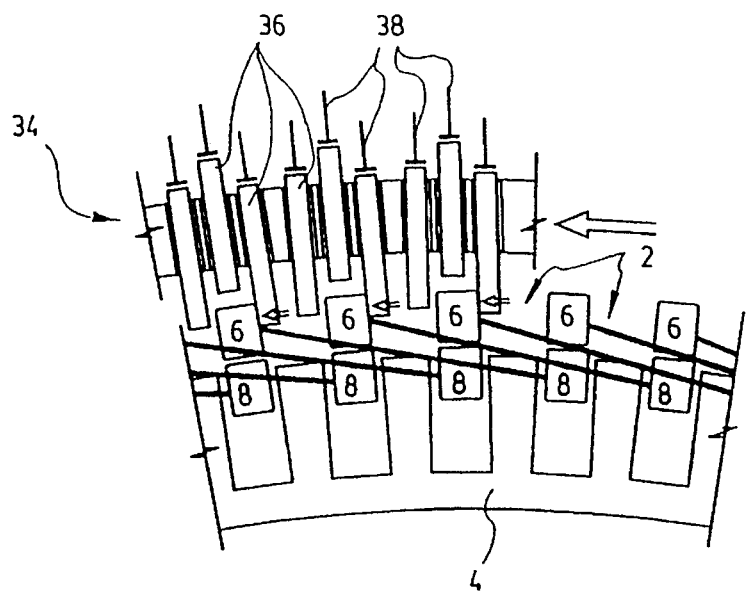
Figure 25:
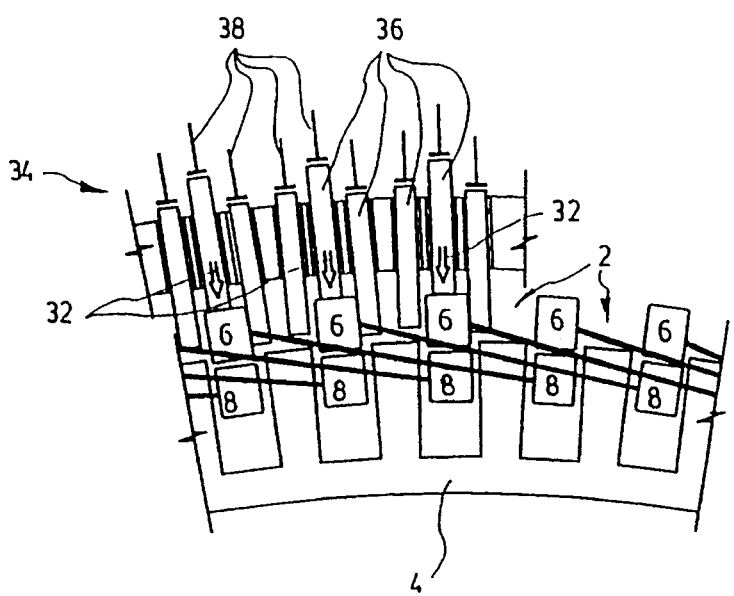

The method comprises steps of (a) inserting one conductor side 8 of each conductor section 2 at least partially into a corresponding slot of the frame 4, as shown in FIG. 22; (b) positioning the other conductor side 6 of each conductor section 2 one beside the other along said stator frame, as shown in FIG. 23; (c) after said steps (a) and (b), circumferentially shifting the other conductor sides 6 with respect to the stator frame 4, as shown in FIG. 24, until they are superimposed respectively above the conductor sides 8 for forming pairs of superimposed conductor sides 6 and 8; and (d) after said step (c), applying a force 32 onto the conductor sides 6 along a radial direction of the circular stator frame 4 for inserting the pairs of superimposed conductor sides 6 and 8 completely into the corresponding slots.

Steps (c) and (d) of the method are performed by means of a crown-shaped assembly 34 having along its periphery a series of adjacent members 36 movable along radial direction when a force is applied by means of pistons 38.

Figure 27:
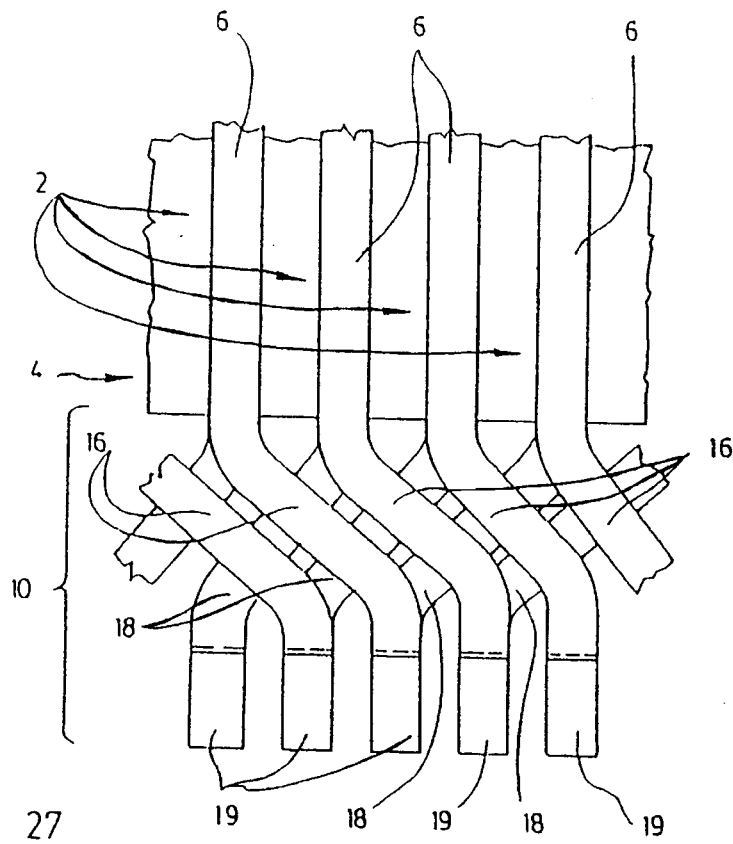
FIG. 27 is a partial top view of a stator frame provided with conductor sections.
Figure 28:
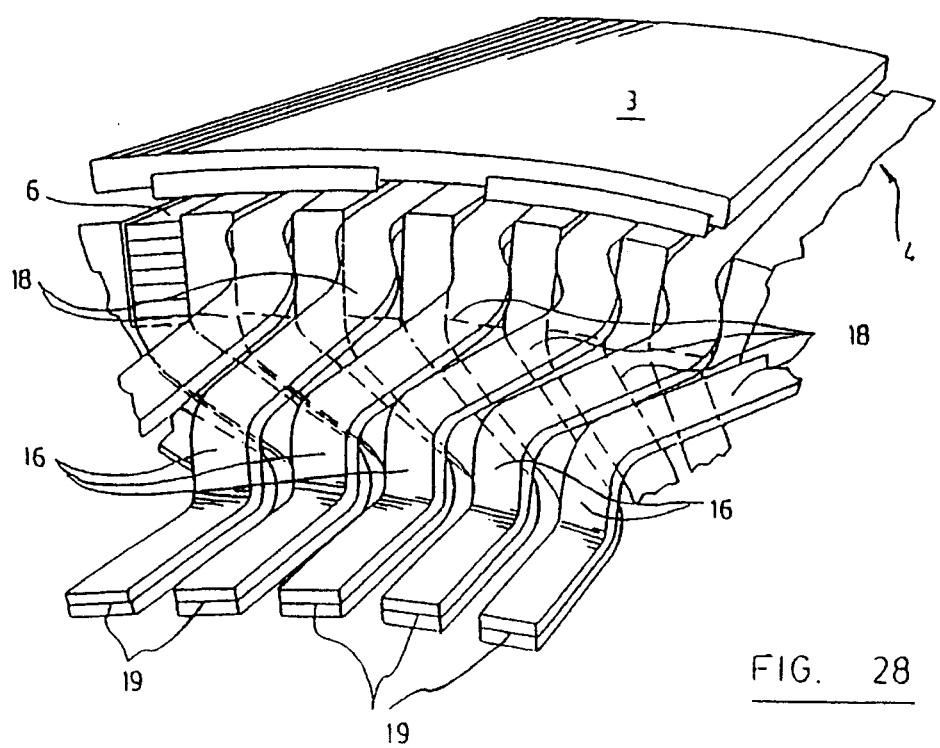
FIG. 28 is a partial perspective view of what is shown in FIG. 27.

Referring now to FIGS. 27 and 28, there are shown a plurality of conductor sections 2 in combination with the stator frame 4. The stator frame 4 is a circular shaped stator frame 4 provided with circumferentially distributed parallel slots. The frame 4 has a surface adjacent to the rotor 3 of the machine when it is assembled. The frame 4 is separated from the rotor 3 by an air gap. The plurality of conductor sections 2 is connected in series to form at least two stator windings. The two sides of each conductor section 2 are respectively fitted into two corresponding parallel slots of the stator frame 4. Each conductor section 2 is constituted of at least one turn to form a coil. Each conductor section 2 comprises two opposite heads 10 located respectively at opposite ends of the two parallel sides. Each conductor section 2 comprises two connecting ends 16 and 18 connecting via connecting contacts 19 the conductor sections 2 in series, each connecting contact 19 being equidistant from the two corresponding conductor sections 2. The two connecting ends 16 and 18 of each conductor section are formed at only one corresponding head 10 thereof.

Although, the present invention has been explained hereinabove by way of a preferred embodiments thereof, it should point out that any modifications to these preferred embodiments, within the scope of the appended claims is not deemed to change or alter the nature and scope of the invention.

The embodiments of the invention in which an exclusive property or privilege is claimed are defined as follows:

1. A method for mounting conductor sections of a stator winding onto a circular shaped stator frame of a dynamoelectric machine, each of said conductor sections having two parallel conductor sides and at least one conductor head connecting two adjacent ends of said parallel sides, said stator frame being provided with circumferentially distributed parallel slots, comprising steps of:

a) inserting one conductor side of each conductor section at least partially into a corresponding slot of said parallel slots;

b) positioning the other conductor side of each conductor section one beside the other along said stator frame;

c) after said steps (a) and (b), circumferentially shifting said other conductor sides with respect to said stator frame until said other conductor sides are superimposed respectively above said one conductor sides for forming pairs of superimposed conductor sides; and d) after said step (c), applying a force onto said other conductor sides along a radial direction of said circular stator frame for inserting said pairs of superimposed conductor sides completely into the corresponding slots.

2. A method according to claim 1, further comprising, before said step (a), a step of forming said heads of said conductor sections so that each of said heads shows substantially an U-shaped body when seen from a top view perpendicular to a plane defined by the two corresponding conductor sides, and a waved-shape body when seen from a front view contained in said plane.

3. A method according to claim 1, wherein, in said step (c), each of said heads has its two sides disposed three slots away from each other.

4. A method according to claim 1, further comprising a step (e) of electrically connecting at least some of said conductor sections in series to obtain at least one stator winding.

* * * * *